United States Patent [19]

Henter

[11] 4,172,326
[45] Oct. 30, 1979

[54] WHEEL ALIGNING APPARATUS

[76] Inventor: Theodore C. Henter, 127 E. Montgomery Crrds., Savannah, Ga. 31406

[21] Appl. No.: 823,054

[22] Filed: Aug. 9, 1977

[51] Int. Cl.² .................... G01B 5/255; G01B 11/275
[52] U.S. Cl. ................................. 33/288; 33/203.18
[58] Field of Search .................... 33/288, 203, 203.18, 33/228, 288; 248/246, 296

[56] References Cited

U.S. PATENT DOCUMENTS

| 789,843 | 5/1905 | Dennis | 248/246 |
| 2,958,134 | 11/1960 | Wilkerson | 33/228 |

FOREIGN PATENT DOCUMENTS

| 1071620 | 12/1959 | Fed. Rep. of Germany | 33/288 |
| 90445 | 12/1921 | Switzerland | 248/296 |

Primary Examiner—William D. Martin, Jr.
Attorney, Agent, or Firm—David H. Semmes

[57] ABSTRACT

A wheel alignment apparatus including a pair of open-sided rectangular frames pivoted at their ends with respect to each other. The inner, or wheel engaging frame, is placed over a vehicle wheel or the like such that the outer or sighting frame extends laterally of the wheel. Aligning idicia are supported on the outer sighting frame so that, for example, a front wheel positioned within the wheel engaging frame may be aligned longitudinally with respect to the rear tire positioned within a similar wheel engaging and pivoted sighting frame.

10 Claims, 3 Drawing Figures

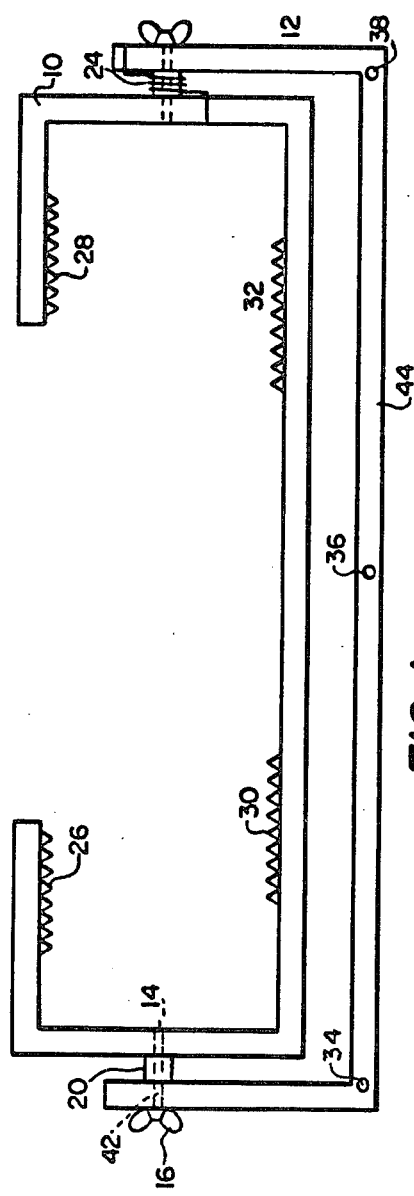

WHEEL ALIGNING APPARATUS

BACKGROUND OF THE INVENTION

1. Field of the Invention

Vehicle wheel aligning apparatus. A particular problem is presented in the alignment of single track vehicles, such as motorcycles and the like. The desired objective is that the longitudinal axis through the center of the front wheel and the longitudinal axis through the center of the rear wheel shall be parallel, i.e., both wheels will track in a common vertically extending longitudinal plane to assure ease of vehicle handling and control.

2. Description of the Prior Art

Pre-examination investigation has been conducted, as follows:

Class 29, sub-classes 273,407;
Class 33, sub-classes 203.18, 203.19, 203.2 and 336.

Peters, U.S. Pat. No. 2,249,226, shows a wheel aligning device including a saddle mounted on the wheels (FIGS. 4, 5) which supports a light projecting device 2. The beams of light are projected on graduated screens 6, which when compared indicate the degree of misalignment.

MacMillan, U.S. Pat. No. 3,135,052, discloses wheel alignment apparatus including an assembly 6 to be mounted on the front wheel. The assembly includes a bar 16 having spaced pins 34 (FIG. 2) with each pin having a sighting hole 36 (FIG. 3). A wheel target 48 is positioned in front of the rear wheel. Sighting through apertures 36 in relation to target 48 determines alignment.

Manlove, U.S. Pat. No. 3,164,910, shows an arrangement substantially like that of Manlove, U.S. Pat. No. 3,181,248, discussed hereafter.

Manlove U.S. Pat. No. 3,181,248 relates to a wheel alignment apparatus. The device includes a plurality of mounting members, with one removable member connected to each wheel. A cable 121 (FIG. 1) extends between the front and rear wheel mounting members. The rear wheel mounting member includes an indicating device 115, 118 to show the degree of misalignment between wheels. FIG. 14 shows this relationship.

Holub U.S. Pat. No. 3,337,961 teaches a wheel checking instrument having a light beam projector 20 removably attached to the side of the front wheel by supporting arm 22 (FIG. 1). The rear wheel has a target 24 (with gridwork marked on) removably attached thereto. The light beam projector, throws a beam of light on the gridwork target; and the reading on the target indicates wheel alignment or frame distortion.

The prior art devices are for the most part complex devices designed for mounting upon the exterior sides of an automobile wheel. For the most part they are adaptable only to vehicles having the same width tires in front and rear.

SUMMARY OF THE INVENTION

According to the present invention an outer sighting frame is pivoted upon the longitudinal axis of an inner wheel engaging frame, so as to present a sighting surface laterally of the wheel being aligned. The outer sighting frame is of such weight that torque is provided to press the inner frame against the wheel in secure position. When two such devices are mounted upon the fore and aft tires, of a motorcycle, for example, the tires may be aligned with respect to each other by sighting along the sighting surface towards the mid-portion indicator sighting of the opposed wheel. Thus extremely accurate alignment is provided without expensive gadgetry.

BRIEF DESCRIPTION OF THE DRAWINGS

FIG. 1 is a plan view of the outer sighting frame, pivoted upon the longitudinal axis of the inner wheel-engaging frame;

FIG. 2 is a side elevation showing the inner wheel engaging frame mounted upon a wheel with the sighting frame laterally presented at a right angle to the longitudinal plane of the wheel;

FIG. 3 is an end elevation thereof.

In FIG. 1 the wheel aligning apparatus is illustrated as including an inner wheel engaging frame 10, having tire engaging adhesive elements or the like 26, 28, 30 and 32 mounted upon its interior periphery. An outer sighting frame 12 opened at one side is pivoted at each end upon the longitudinal axis of the inner wheel engaging frame 10 by, for example, a wing nut 16 which may be secured to a shaft 14, indicated in phantom extending from inner wheel engaging frame 10 through collar 20, with an appropriate aperture 42 (indicated in phantom) as shown at a first end of the outer or sighting frame.

The wing nuts, of course, provide a locking torque such that sighting frame 12 may be presented laterally and in a horizontal plane by rotating the wheel, as illustrated in FIGS. 2 and 3. A plurality of alignment sighting elements, 34, 36 and 38 extend upwardly from the closed side, 44, of frame 12 and the center or mid-portion element 36 will always lie in a vertical plane through the axle 14 when outer sighting frame 44 is rotated, on the wheel, into a horizontal position. A counter balance spring 24, or the like, may be provided for counter balancing of the frames with respect to each other.

As will be apparent, one device is mounted upon each of the fore and aft wheels of the vehicle, such that a sight may be along elements 34, 36 and 38 of the wheel being aligned and towards the sighting elements positioned upon a similar aligning apparatus mounted upon the other wheel. The device will fit any size tire, while assuring that the mid-portion sighting element 36 will always lie in a transverse vertical plane through the axle 14 when the element 44 is horizontally disposed. The angular adjustment (x) between one vertical side of the tire and the element 12, as illustrated in FIG. 3, is to be identical for both front and rear wheels on a motorcycle, for example, to ensure alignment when sighting fore and aft.

One important advantage of the present device is the ability to accomodate wheels of different widths at the front and rear positions; a common situation in motorcycle configurations. The outer frame 12 is easily adjustable with reference to the vertical side of the wheel, so that various angular orientations required of the inner frame, 10, due to variations in thickness to tire 40 are of no consequence. When the plane of frame 12 is adjusted so as to be perpendicular to the vertical side of the wheel to which it is attached, i.e., angle x is at 90°, the entire wheel may then be rotated so that the sighting portion 44 of frame 12 is placed horizontally, relative to the ground. Then, the sighting portion 44 on the second assembly which is attached to the other wheel need only be placed so that it is also parallel to the horizontal ground reference, and the second outer frame, 12, rotated to an angle which makes the sighting marks, 34–38, on one wheel, co-linear or parallel to the center mark 36 on the first wheel. If this co-linearity is not found, because, for example, the rear axle of the motorcycle has been skewed during a chain replacement, then the rear axle is adjusted so that sighting marks on each wheel are rendered either co-linear or parallel. Of course, if the front and rear wheels are of exactly the same outer diameter, though of differing widths, a tight engagement of the inner frame 10 will ensure that when angle x is 90°, the sighting marks will be rendered exactly co-linear, after adjustment.

As will be apparent, the apparatus provides a means of determining whether the rear wheel of a single track vehicle is in line with the front wheel and vice versa. By in line or "proper alignment" applicant intends that the longitudinal axis through the center of the front wheel and the longitudinal axis through the center of the rear wheel are parallel; so that the two wheels track in a common vertically extending longitudinal plane.

Manifestly, the sighting device may be a scope, a light source with collimating lens, a series of pegs or sights or any number of similar devices. In operation the inner wheel engaging frame is placed around one vehicle tire and tilted upon its longitudinal axis with the open side higher than the closed side, so that the adhesive elements 26–32 contact the tire at four points. The longitudinal axis of wheel engaging frame 10 should be approximately parallel to the ground. The outer sighting frame 12 is then locked by means of wing nut 16 in a position approximately perpendicular to the vertical side of the tire, as illustrated in FIG. 3. The weight of frame 12 will impose a torque on frame 10 at the pivot point, so as to force adhesive strips 28–32 against the tire, thereby gripping the entire structural end of the tire. The pivot point at shaft 14 is thusly positioned at the exact middle of the width of tire 40, regardless of tire width. Also, the longitudinal sighting side 44 of frame 12 is always the same transverse distance from and paralell to the longitudinal center line of the tire; regardless of tire width. When similar devices are mounted fore and aft, for example, upon equal outer diameter single track vehicle tires, the angle that frame 12 makes with the vertical side of the tire will be equal to 90° for both front and rear tires. Hence, the sighting platforms 44 on each device will be parallel and coincident when viewed from the front or rear, at proper alignment.

Similar devices are required to be mounted on the front and rear wheels of the vehicle, such that both devices will have the mid-portion peg 36 below and at an equal lateral distance from the middle of the encircled tires. When sighting through the front wheel pegs, indicators 34–38 will place the front wheel in a straight ahead position by aiming directly at the center or mid-portion peg 36 on the rear sighting device. Center peg 36 will lie in a transverse vertical plane through the axle for each tire and, thus, is always the same transverse distance from the longitudinal center axis of each tire, regardless of slight misalignments of each tire.

Hence, even if the front wheel is slightly skewed, one may still position the rear wheel by sighting throught the rear pegs, 34–38, and by adjusting the rear wheel aim the rear pegs directly to the center peg 36 on the front sighting device. Thereafter the pegs 34–38 on the front wheel can be made to align with center peg 36 on the rear frame; and proper alignment for both wheels confirmed by total linear coincidence of the pegs 34–36 on each wheel.

Manifestly, the device may be modified without departing from the spirit of invention, and the invention is to be defined solely by the scope of the appended claims.

I claim:

1. A wheel aligning apparatus of the type adapted to be mounted upon the wheel of a vehicle, so as to align the wheel with the longitudinal axis of the vehicle comprising:
   (A) A wheel-engaging rectangular frame, having elements which embrace both an inner chord portion and an outer chord portion of a wheel;
   (B) A sighting frame having two end portions pivoted upon the longitudinal axis of the wheel engaging rectangular frame and having a lateral opening at one side, so as to extend laterally and in parallel with respect to said wheel engaging frame; and
   (C) Longitudinal sighting indicators supported upon said sighting frame.

2. A wheel aligning apparatus as in claim 1, said wheel engaging frame, having a lateral opening at one side.

3. A wheel aligning apparatus as in claim 1, said wheel engaging frame including tire engaging adhesive means mounted within the periphery of said frame, so as to be contactable with the tire sides.

4. A pair of wheel aligning apparatus as in claim 1, one of said wheel aligning apparatus being mounted upon a tire and being aligned longitudinally fore and aft with respect to the other wheel aligning apparatus mounted upon another aligned vehicle tire.

5. A wheel aligning apparatus as in claim 3, including adjustable lock means interposed between said wheel engaging frame and said sighting frame.

6. A wheel aligning apparatus as in claim 5, including a counterbalancing resilient member interposed between said wheel engaging frame and said sighting frame.

7. A wheel aligning apparatus as in claim 6, said sighting frame being of a weight sufficient to apply torque to said wheel engaging frame such that said wheel engaging frame is self-supported upon the sides of a tire being applied.

8. A wheel aligning apparatus as in claim 7, said sighting indicators being positioned at the ends and mid-portion of said sighting frame.

9. A wheel aligning apparatus as in claim 8, said mid-portion aligning member being co-incident with the longitudinal center of a wheel positioned within said wheel engaging frame.

10. A wheel aligning apparatus as in claim 1, said sighting frame being pivoted with respect to said wheel engaging frame and locked in a sighting angle perpendicular to the vertical axis of said wheel.

* * * * *